(12) United States Patent
Arai et al.

(10) Patent No.: US 6,631,223 B2
(45) Date of Patent: Oct. 7, 2003

(54) OPTICAL MULTIPLEXER/DEMULTIPLEXER

(75) Inventors: Hideaki Arai, Ibaraki (JP); Takafumi Chiba, Ibaraki (JP); Hisato Uetsuka, Ibaraki (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 09/783,385

(22) Filed: Feb. 15, 2001

(65) Prior Publication Data

US 2001/0051018 A1 Dec. 13, 2001

(30) Foreign Application Priority Data

Mar. 3, 2000 (JP) ........................ 2000-063302

(51) Int. Cl.[7] .............. G02B 6/28; G02B 6/26; G02B 6/42
(52) U.S. Cl. .............. 385/24; 385/31; 385/39; 385/42; 359/115; 359/124
(58) Field of Search ............................ 385/24, 27, 31, 385/15, 39–42, 48, 16, 3; 359/115, 124

(56) References Cited

U.S. PATENT DOCUMENTS

| 5,596,661 A | * | 1/1997 | Henry et al. .............. 385/24 |
| 5,852,505 A | | 12/1998 | Li .............................. 359/118 |
| 6,266,464 B1 | * | 7/2001 | Day et al. .................. 385/37 |

* cited by examiner

*Primary Examiner*—Brian Healy
*Assistant Examiner*—Kevin S Wood
(74) *Attorney, Agent, or Firm*—Antonelli, Terry, Stout & Kraus, LLP

(57) ABSTRACT

In the optical multiplexer/demultiplexer according to the invention, an MMI (multi mode interference) coupler having a percentage coupling of about 50% is used as first and second optical couplers, and a directional coupler having a percentage coupling of less than 10% is used as third and fourth optical couplers. By virtue of this constitution, the optical multiplexer/demultiplexer according to the invention has a small dependency upon wavelength and can be used in a wide waveband, is less susceptible to a preparation error, and, at the same time, has good wavelength flatness in passband and a wide rejection band.

14 Claims, 10 Drawing Sheets

1: SUBSTRATE
2: INPUT/OUTPUT PORT
3: INPUT/OUTPUT PORT
4: INPUT/OUTPUT PORT
5: INPUT/OUTPUT PORT
6: MMI OPTICAL COUPLER
7: MMI OPTICAL COUPLER
8: DIRECTIONAL COUPLER
9: DIRECTIONAL COUPLER
10: WAVEGUIDE
11: WAVEGUIDE
12: WAVEGUIDE
13: WAVEGUIDE
14: WAVEGUIDE
15: WAVEGUIDE
$\lambda$: OPTICAL SIGNAL

- 1: SUBSTRATE
- 2: INPUT/OUTPUT PORT
- 3: INPUT/OUTPUT PORT
- 4: INPUT/OUTPUT PORT
- 5: INPUT/OUTPUT PORT
- 6: MMI OPTICAL COUPLER
- 7: MMI OPTICAL COUPLER
- 8: DIRECTIONAL COUPLER
- 9: DIRECTIONAL COUPLER
- 10: WAVEGUIDE
- 11: WAVEGUIDE
- 12: WAVEGUIDE
- 13: WAVEGUIDE
- 14: WAVEGUIDE
- 15: WAVEGUIDE
- λ: OPTICAL SIGNAL

- 8: DIRECTIONAL COUPLER
- 8a: WAVEGUIDE
- 8b: WAVEGUIDE
- 8c: CLADDING

- 1: CLADDING
- 8a: WAVEGUIDE
- 8b: WAVEGUIDE

θ : PHASE DIFFERENCE
A : AMPLITUDE OF ELECTRIC FIELD

θ : PHASE DIFFERENCE
A : AMPLITUDE OF ELECTRIC FIELD

- 19 : SUBSTRATE
- 20 : INPUT PORT
- 21 : INPUT PORT
- 22 : OUTPUT PORT
- 23 : OUTPUT PORT
- 24 : OPTICAL COUPLER
- 25 : OPTICAL COUPLER
- 26 : OPTICAL COUPLER
- 27 : OPTICAL COUPLER
- 28 : WAVEGUIDE
- 29 : WAVEGUIDE
- 30 : WAVEGUIDE
- 31 : WAVEGUIDE
- 32 : WAVEGUIDE
- 33 : WAVEGUIDE
- $\lambda$ : OPTICAL SIGNAL

- 26 : OPTICAL COUPLER
- 26a : WAVEGUIDE
- 26b : WAVEGUIDE
- 26c : CLADDING

- 19 : SUBSTRATE
- 26a : WAVEGUIDE
- 26b : WAVEGUIDE
- 19' : CLADDING

OPTICAL MULTIPLEXER/DEMULTIPLEXER

FIELD OF THE INVENTION

The invention relates to an optical multiplexer/demultiplexer, and particularly to an optical multiplexer/demultiplexer which has excellent wavelength flatness in passband, has a wide rejection band, and can function over a wide waveband.

BACKGROUND OF THE INVENTION

An interleave system, which is one form of advanced wavelength multiplexing communications, requires an optical multiplexer/demultiplexer having a function such that a signal with certain channel wavelength spacings is demultiplexed to two signals with doubled channel wavelength spacings, or conversely, two signals are multiplexed to one signal.

FIG. 11 is an explanatory view showing one example of a prior art technique for coping with this demand. FIG. 11A shows a quartz-based plane optical wave circuit provided on a quartz substrate. This quartz-based plane optical wave circuit comprises four optical couplers 24, 25, 26, 27 and waveguide pairs each comprising two waveguides with different lengths (28, 29), (30, 31), (32, 33), for connecting the optical couplers to each other, that is, a pair of waveguides with different lengths (28, 29) for connecting the optical coupler 24 to the optical coupler 25, a pair of waveguides with different lengths (30, 31) for connecting the optical coupler 25 to the optical coupler 26, and a pair of waveguides with different lengths (32, 33) for connecting the optical coupler 26 to the optical coupler 27. Here due to a difference in optical path length, a phase difference occurs between light, which passes through the waveguide 28, and light which passes through the waveguide 29. The quartz-based plane optical wave circuit is designed so that, when the phase difference caused in the waveguide pair (28, 29) is $\phi$, the phase difference caused in the waveguide pair (30, 31) is $2\phi$ while the phase difference caused in the waveguide pair (32, 33) is $4\phi$. There are eight optical paths for allowing light to be input through an input port 20 and to be output through output ports 22, 23. Among them, the shortest optical path is such that light is passed through the waveguide 29, the waveguide 31, and the waveguide 33 in that order. The next shortest optical path is such that light is passed through the waveguide 28, the waveguide 31, and the waveguide 33 in that order. The phase difference in the shortest optical path and the next shortest optical path is $\phi$. Likewise, in the case of third, fourth, fifth, sixth and seventh shortest optical paths and the longest optical path, the phase differences are $3\phi$, $4\phi$, $5\phi$, $6\phi$, and $7\phi$, respectively. Here a rectangular, periodic spectral response can be achieved by suitably determining the percentage coupling of optical couplers 24, 25, 26, and 27. Specifically, each term of Fourier series is expressed in terms of a phase difference in each optical path in such a manner that, when a rectangular periodic function is subjected to Fourier series development, the first term is expressed in terms of a component having a phase difference of $\phi$ and the next term is expressed in terms of a component having a phase difference of $2\phi$. In this case, for the optical couplers, the percentage coupling is determined according to the Fourier coefficient. Thus, when the components for the optical paths are added, a spectral response close to a rectangular shape is provided.

In the case of optical multiplexer/demultiplexers for use in interleave, it is ideal that passband and rejection band are periodically realized as a rectangular spectrum. In short, what is important for the prior art technique is to provide a rectangular spectral response by determining this period through the phase difference $\phi$, taking the phase difference created in the second-stage waveguide pair (30, 31) as $2\phi$, and taking the phase difference created in the third-stage waveguide pair (32, 33) as $4\phi$ to properly determine the percentage coupling of the optical couplers.

The conventional multiplexer/demultiplexer is designed so as to function in the best state at a wavelength of 1.545 $\mu$m. The optical couplers 24, 25 are directional couplers having a percentage coupling of about 50% at a wavelength of 1.545 $\mu$m, the optical coupler 26 is a directional coupler having a percentage coupling of about 98% at a wavelength of 1.545 $\mu$m, and the optical coupler 27 is a directional coupler having a percentage coupling of about 2% at a wavelength of 1.545 $\mu$m. The waveguide 28 is identical to the waveguide 29 in refractive index and shape of waveguide and is longer by about 2,033 $\mu$m than the waveguide 29. Similarly, the waveguide 30 is longer by 4,066 $\mu$m than the waveguide 31, and the waveguide 32 is longer by 8,132 $\mu$m than the waveguide 33. The waveguides each have a core width of 6 $\mu$m and a core height of 6 $\mu$m. The difference in specific refractive index between the core and the cladding, $\Delta$, is 0.8%.

FIGS. 12 and 13 are diagrams showing wavelength loss characteristics for the conventional optical multiplexer/demultiplexer, wherein FIG. 12 shows wavelength loss characteristics for the output port 22 in the case where light is introduced through the input port 20, while FIG. 13 shows wavelength loss characteristics for the output port 23 in the wavelength range of 1.546 $\mu$m to 1.550 $\mu$m. As can be seen from the drawings, a wavelength-flat passband and a wide rejection band are realized at the designed wavelength around 1.545 $\mu$m.

Further, the passband and the rejection band are repeated at periods of about 0.8 nm. This is determined according to the optical path length difference of the waveguides 28, 29.

In the construction wherein the differences in phase between the optical couplers are $\phi$, $2\phi$, $4\phi$, however, the use of optical couplers having a high percentage coupling of not less than 50% is unavoidable. That is, this construction should comprise directional couplers having a high percentage coupling. This construction, when applied to practical use, poses the following problems.

FIG. 14 shows spectral characteristics at wavelengths shorter than the designed wavelength, and FIG. 15 spectral characteristics at wavelengths longer than the designed wavelength. As can be seen from the drawings, the level of the rejection band is lowered, and, as compared with the isolation characteristics around the wavelength 1.545 $\mu$m, a deterioration in isolation characteristics is significant. The worst isolation value at an ITU-grid wavelength $\pm 0.08$ nm in the wavelength range of 1.53 $\mu$m to 1.56 $\mu$m is 17 dB which cannot be said to be satisfactory for practical use. This is attributable mainly to the dependency of the percentage coupling of the optical couplers 24, 25, 26 upon the wavelength. For the optical coupler 27, the percentage coupling is so low that the coupling length is short and the wavelength dependency is small.

FIGS. 16 and 17 are diagrams showing the influence of a dimensional error of the gap between waveguides (Gap in FIG. 11C) in a directional coupler caused in the preparation of the directional coupler, wherein FIG. 16 shows wavelength characteristics in the case where the gap has been narrowed by 0.3 $\mu$m, and FIG. 17 wavelength characteristics in the case where the gap has been widened by 0.3 µm. As shown in the drawings, since the isolation characteristics are significantly deteriorated, these directional couplers cannot be used in the optical multiplexer/demultiplexer. This is attributable to the fact that the percentage coupling of the directional coupler is likely to be influenced by the dimensional error. In the case of the optical coupler 27, however, since the coupling length is small, the influence of the error is likely to be relatively small, whereas, for the other optical couplers 24, 25, 26, the isolation characteristics are significantly influenced and deteriorated.

FIGS. 11B and 11C are enlarged views of the directional coupler 26 shown in FIG. 11A, wherein FIG. 11B is an upper plan view and FIG. 11C a cross-sectional view taken on a dotted line of FIG. 11B. In the preparation process of the waveguide, a technique for forming a cladding in the narrow gap between the waveguides (an embedding technique) is very sophisticated. Therefore, embedding of the cladding in the gap between the waveguides is likely to be causative of a deteriorated yield. When Gap in FIG. 11C is larger than the core height of the waveguide, the application of a plasma CVD process becomes possible which can form waveguides having small polarized light dependency. For this reason, the larger the gap between the waveguides, the better the results.

Since, however, in the prior art technique, the percentage coupling of the optical coupler 26 is about 98%, the length of the directional coupler should be not less than 10 mm, for example, when the gap, Gap, between the waveguides is brought to 6 µm for making it possible to apply the plasma CVD process. This leads to an excessively large size of the device which is unrealistic. In the prior art technique, a Gap of about 3.5 µm was adopted to narrow the gap between the waveguides.

SUMMARY OF THE INVENTION

Accordingly, it is an object of the invention to solve the above problems of the prior art and to provide an optical multiplexer/demultiplexer which has small wavelength dependency, can be used over a wide waveband, is less susceptible to a preparation error, and, at the same time, has good wavelength flatness in passband and a wide rejection band.

In order to attain the above object of the invention, in the optical multiplexer/demultiplexer according to the invention, a construction was adopted wherein the wavelength dependency of the directional coupler and the influence of characteristics sensitive to the preparation error are minimized.

Thus, according to the first feature of the invention, an optical multiplexer/demultiplexer has a construction such that Mach-Zehnders, each comprising four optical couplers each having two input ports and two output ports and disposed in series while connecting the adjacent two optical couplers to each other by two waveguides different from each other in length, are connected in multistage, wherein on a first connection side, a longer waveguide in the waveguides connecting a first optical coupler to a second optical coupler, a shorter waveguide in the waveguides connecting the second optical coupler to a third optical coupler, and a longer waveguide in the waveguides connecting the third optical coupler to a fourth optical coupler are continuously connected, while on a second connection side opposite to the first connection side, a shorter waveguide in the waveguides connecting the first optical coupler to the second optical coupler, a longer waveguide in the waveguides connecting the second optical coupler to the third optical coupler, and a shorter waveguide in the waveguides connecting the third optical coupler to the fourth optical coupler are continuously connected. This construction can eliminate the need to use directional couplers having a percentage coupling of more than 50%.

Assuming that an MMI (multi mode interference) coupler having a percentage coupling of about 50% is used as the first and second optical couplers while a directional coupler having a percentage coupling of less than 10% is used as the third and fourth optical couplers and, in addition, the difference in phase between two waveguides connecting the first optical coupler to the second optical coupler is $\phi$, the difference in phase between two waveguides connecting the second optical coupler to the third optical coupler and the difference in phase between two waveguides connecting the third optical coupler to the fourth optical coupler are preferably $-2\phi$ and $4\phi\pm\pi$, respectively.

BRIEF DESCRIPTION OF THE DRAWINGS

The invention will be explained in more detail in conjunction with the appended drawings, wherein:

FIG. 1 is an explanatory view showing a preferred embodiment of the invention, wherein

FIG. 11 is an explanatory view showing a prior art technique, wherein

DESCRIPTION OF THE PREFERRED EMBODIMENTS

Preferred embodiments of the invention will be explained in conjunction with the accompanying drawings.

Figure 9:
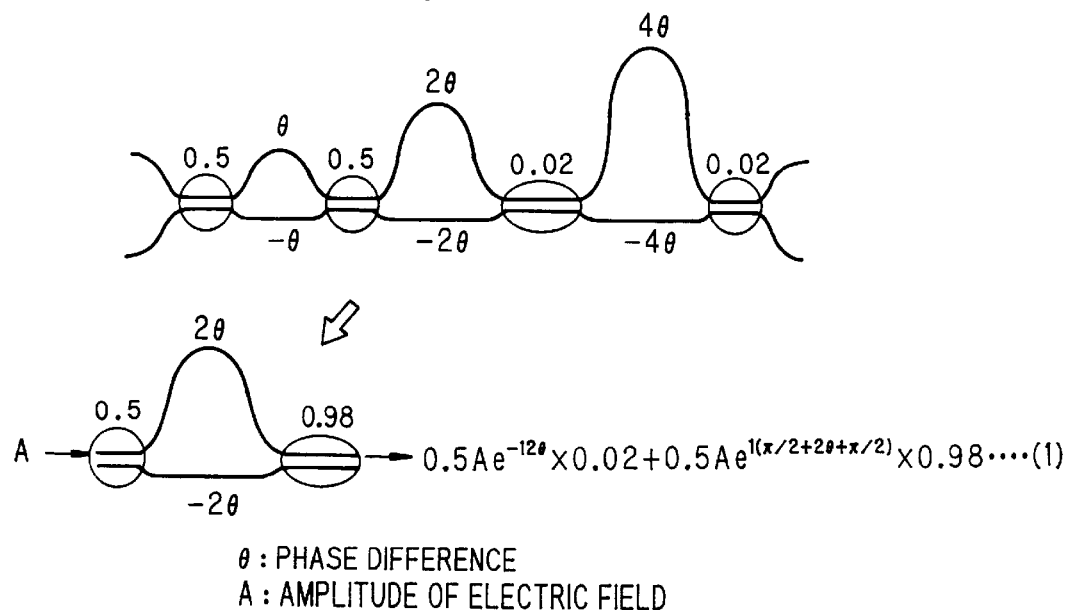
FIG. 9 is a typical view of a conventional optical multiplexer/demultiplexer circuit.
Figure 10:
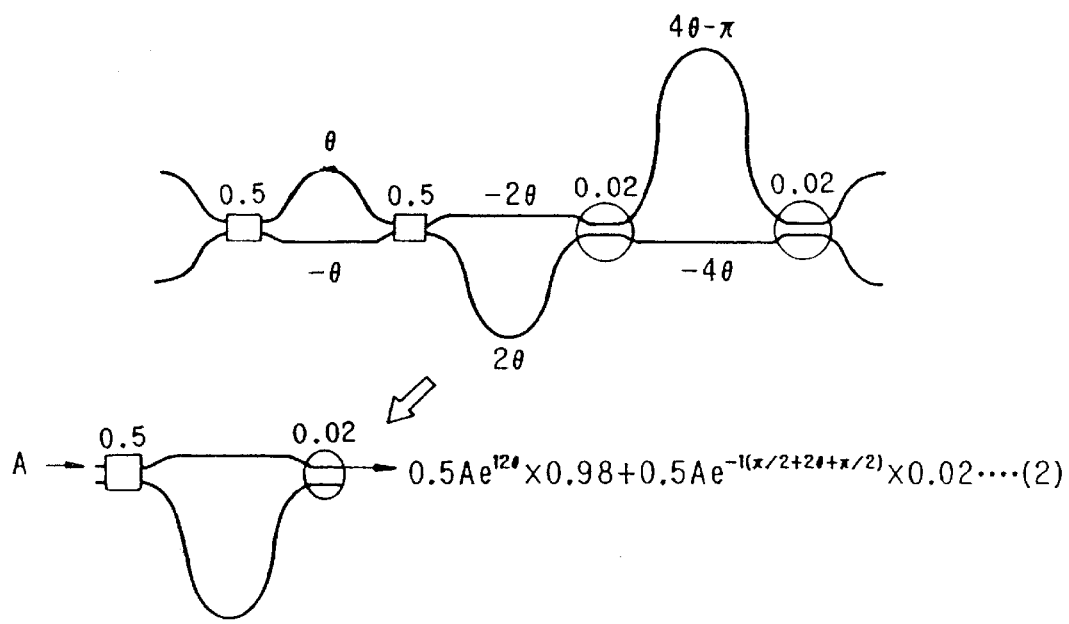
FIG. 10 is a typical view of an optical multiplexer/demultiplexer circuit according to the invention.
Figure 11A:
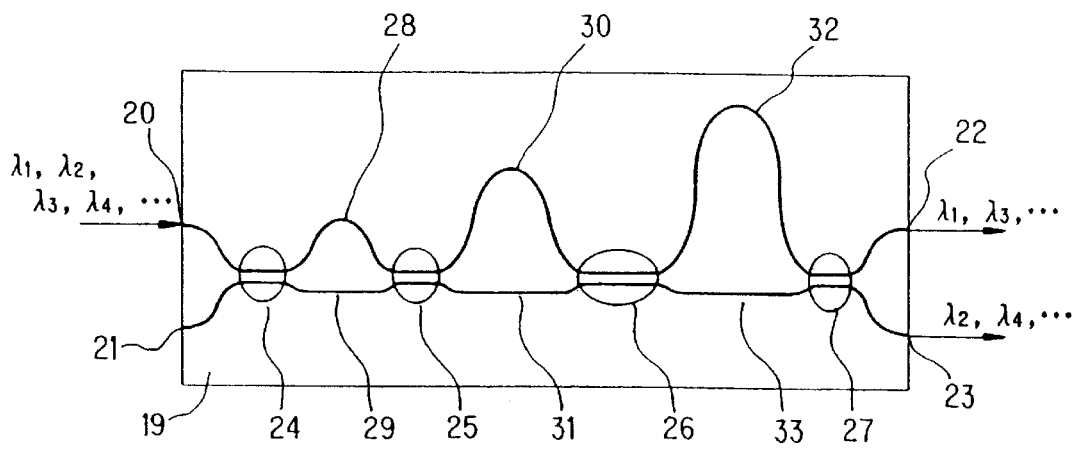
FIG. 11A is a plan view, FIG. 11B an enlarged plan view of a directional coupler, and FIG. 11C a cross-sectional view of the directional coupler.
Figure 11B:
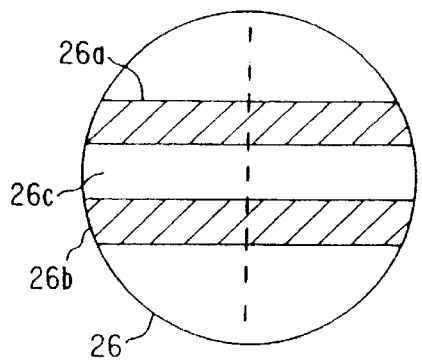
Figure 11C:
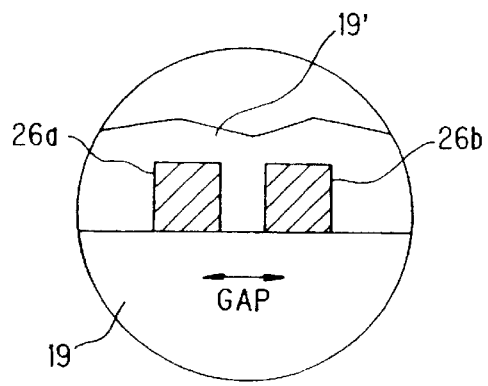

FIGS. 9 and 10 are diagrams illustrating the function of the invention, wherein FIG. 9 schematically illustrates the function of a prior art technique and FIG. 10 the function of the invention. In the drawings, a symbol θ indicates that a phase shift occurs when light passes through waveguides connecting the first optical coupler to the second optical coupler. That is, the difference in phase between the first and second optical couplers is 2θ. In this connection, it should be noted that $\phi=2\theta$. The construction shown in FIG. 9 and the construction shown in FIG. 10 are different from each other in that, in FIG. 9, the first optical coupler is a directional coupler while, in FIG. 10, the first optical coupler is an MMI coupler and that the positional relationship between a longer waveguide and a shorter waveguide in the waveguides connecting the second optical coupler to the third optical coupler is opposite. In theory, as compared with the directional coupler, the MMI coupler does not have wavelength dependency and can provide a percentage coupling of about 50% over a wide wavelength range. Further, the MMI coupler is less likely to undergo the influence of a preparation error.

Further, the percentage coupling of the third optical coupler in FIG. 9 is 98% while that in FIG. 10 is 2%. The directional coupler having a percentage coupling of 2% has a smaller wavelength dependency and is less likely to undergo the influence of the preparation error. Further, when the percentage coupling is 2%, widening the gap between the waveguides does not lead to a significantly increased coupling length. The reason why the percentage coupling 98% can be brought to 2% is as follows.

Equation (1) described in FIG. 9 is an equation which represents field amplitude and phase of light in the case where, in FIG. 9, light with a field amplitude A is introduced through the upper waveguide in the second optical coupler and output through the upper side of the third optical coupler. Likewise, equation (2) described in FIG. 10 is an equation which represents field amplitude and phase of light in the case where, in FIG. 10, light with a field amplitude A is introduced through the upper waveguide in the second optical coupler and output through the upper side of the third optical coupler. The comparison of the equations (1) and (2) shows that multiplying the equation (2) by $\exp(i\cdot\pi)$ renders the equations (1) and (2) identical to each other. This means that the difference in phase between the third and fourth optical couplers is brought to $4\phi-\pi$ rather than $4\phi$. At that time, substantially the same characteristics can be attained when $\pi$ is adopted instead of $-\pi$. Further, a certain level of characteristics can be provided in the case of a value obtained by multiplying $\pi$ by an odd number (in this case, a wavelength range, which can provide good characteristics, is narrowed).

In FIG. 9, light with an amplitude of A, when this light is passed through a longer waveguide between the second and third optical couplers, is transmitted through the second optical coupler and then transmitted through the third optical coupler. On the other hand, in FIG. 10, this light is coupled in the second optical coupler, and then coupled in the third coupler. In the case of the MMI coupler and directional coupler, the phase, when the light is transmitted through the coupler, is different from the phase when the light is coupled in the coupler by $\pi/2$. In FIG. 9, the light is transmitted twice, whereas, in FIG. 10, the light is coupled twice, resulting in a phase difference of $\pi$. The reason why the difference in phase between the third and fourth optical couplers is brought to $4\phi-\pi$ is to cancel this $\phi$.

EXAMPLES

Figure 1A:
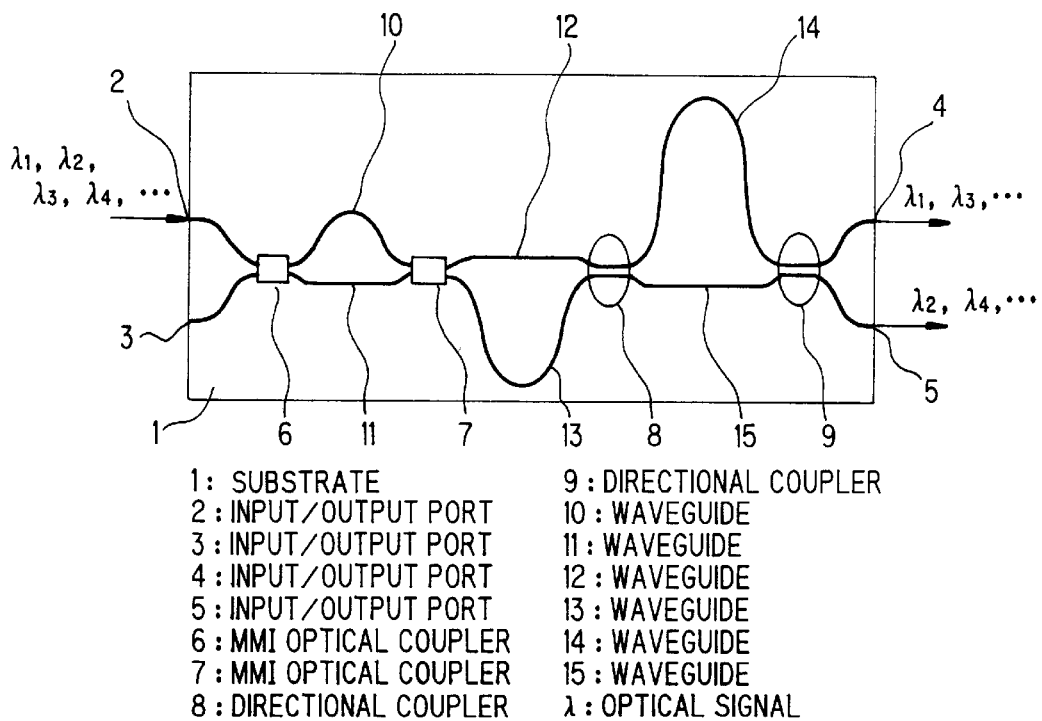
FIG. 1A is a plan view, FIG. 1B an enlarged plan view of a directional coupler, and FIG. 1C a cross-sectional view of the directional coupler.
Figure 1B:
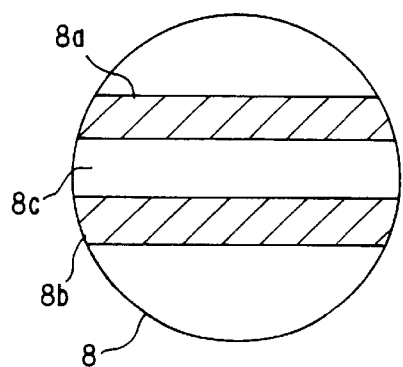
Figure 1C:
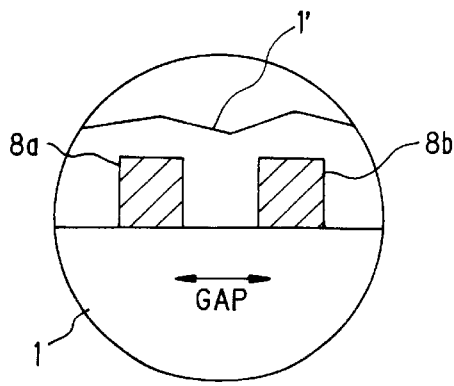

FIG. 1 shows a preferred embodiment of a waveguide-type optical multiplexer/demultiplexer according to the invention, wherein FIG. 1A is a plan view and FIGS. 1B and 1C are enlarged views of a directional coupler 8. Light input through an input port 2 is demultiplexed to output ports 4, 5. In this case, demultiplexing spacings are about 0.4 nm.

The difference in specific refractive index between the core and the cladding is $\Delta=0.8\%$, and the core height of the waveguide is 6 μm. For the four optical couplers, the percentage coupling at a wavelength of 1.545 μm is 50% for the optical coupler 6, 50% for the optical coupler 7, 2.4% for the optical coupler 8, and 2.4% for the optical coupler 9. The optical couplers 6, 7 are MMI couplers having an identical structure, and the optical couplers 8, 9 are directional couplers having an identical structure. For the waveguides 10, 11, 12, 13, 14, 15, the core width is identical, and the radius of curvature in the curved portion is 5 mm. The waveguide 10 is longer by $\Delta L=2033$ μm than the waveguide 11, the waveguide 13 is twice (=4066 μm), $2\Delta L$, longer than the waveguide 12, and the waveguide 14 is longer by $4\times\Delta L-\lambda/\text{Neff}$ than the waveguide 15. In this case, the service wavelength is $\lambda=1.545$ μm, and the waveguide equivalent refractive index is Neff=1.445. The gap, Gap, between waveguides connecting the directional couplers 8, 9 to each other is 6.3 μm, and the coupling length is 0.9 mm. Thus, the dimension is satisfactorily for practical use. If Gap in the prior art technique is 6.3 μm, the coupling length is not less than 10 mm.

A substrate 1 is formed of $SiO_2$, a core is formed of $GeO_2$—$SiO_2$, and a cladding 1' is formed of $SiO_2$. The waveguide is prepared by sputtering a $GeO_2$—$SiO_2$ core layer on the quartz substrate 1, forming an optical circuit pattern, for example, by photolithography or reactive ion etching, and then forming a cladding by plasma CVD. Since the narrowest gap between the waveguides is wider than the core height and is 6.3 μm, the embedding properties were good.

After the preparation of the device, the phase error caused, for example, by the refractive index error, the waveguide core width error, and shrinkage was corrected by applying a $CO_2$ laser to a part of the waveguides 10, 11, 12, 13, 14, 15.

Figure 2:
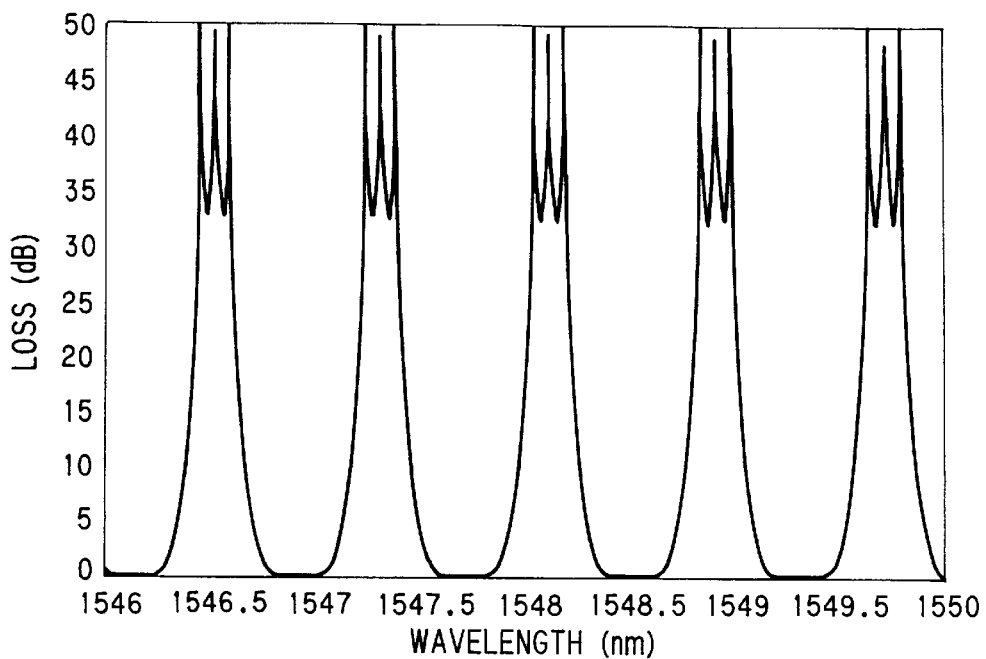
FIG. 2 is an explanatory view showing the wavelength loss characteristics of a preferred embodiment of the invention.
Figure 3:
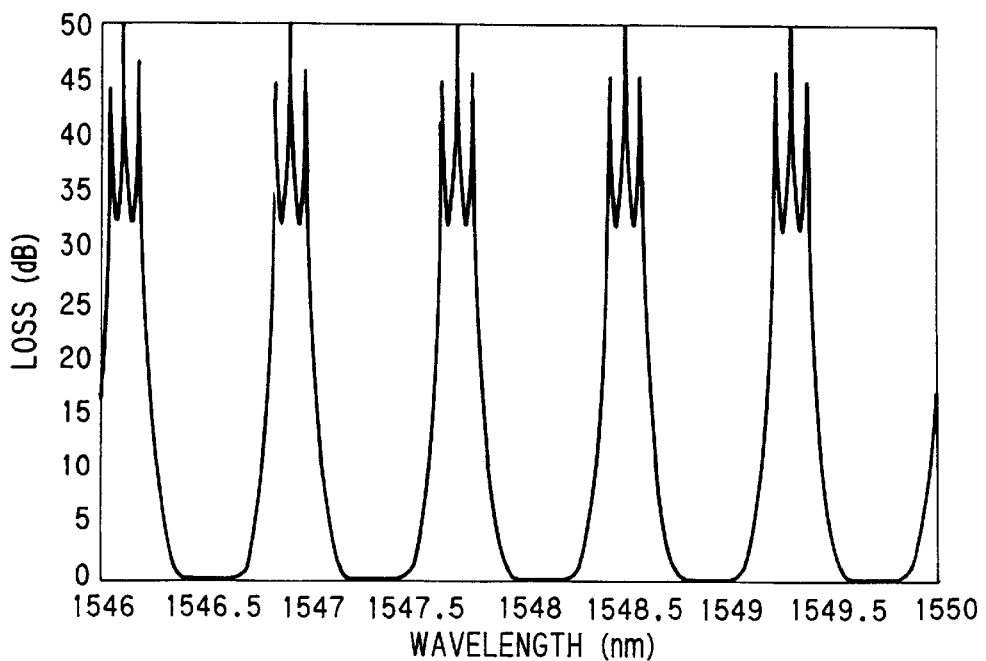
FIG. 3 is an explanatory view showing the wavelength loss characteristics of a preferred embodiment of the invention.
Figure 4:
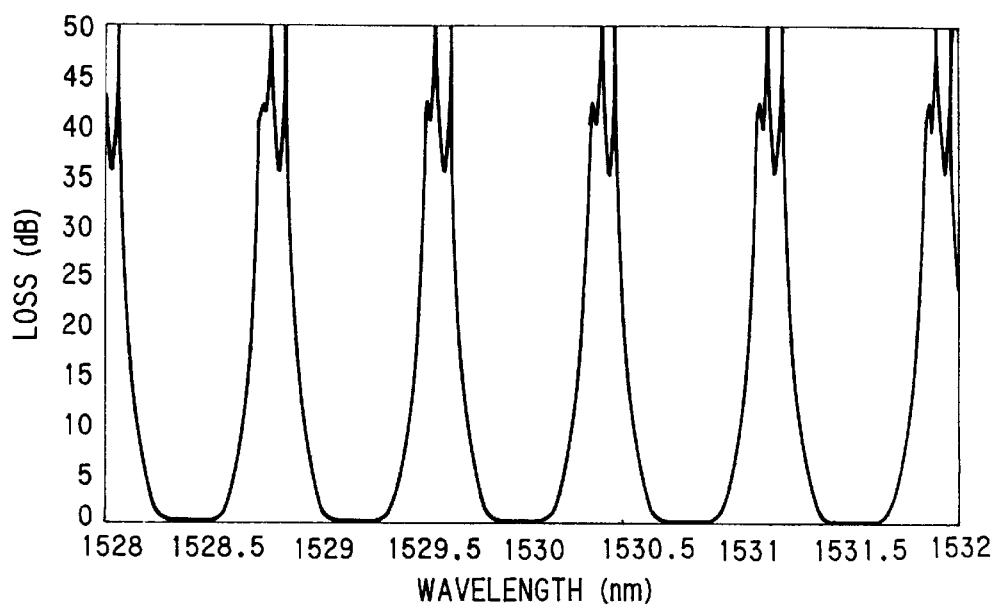
FIG. 4 is an explanatory view showing the wavelength loss characteristics of a preferred embodiment of the invention.
Figure 5:
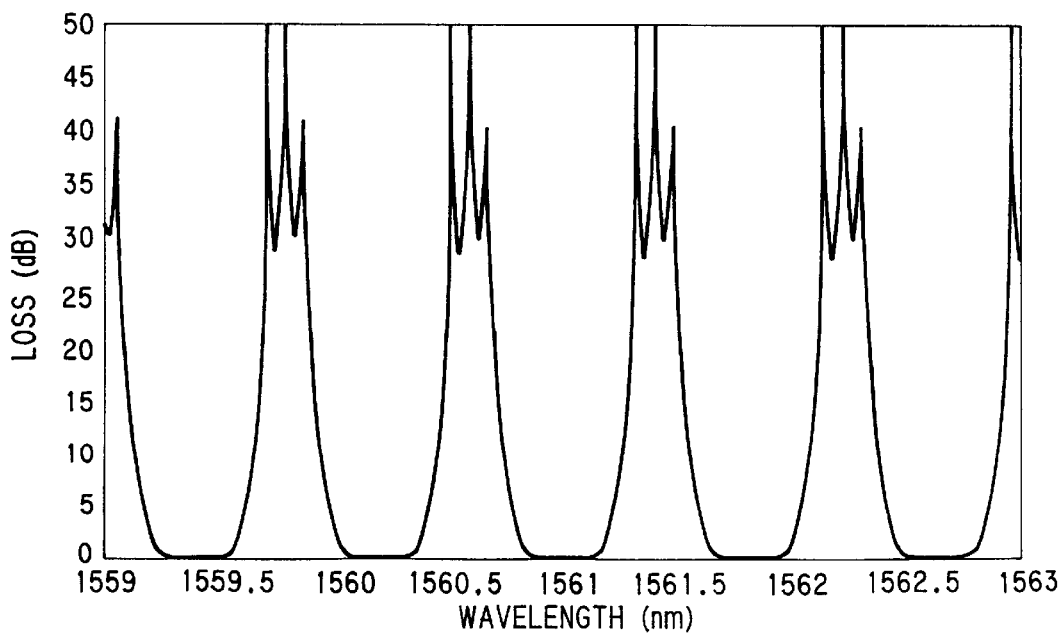
FIG. 5 is an explanatory view showing the wavelength loss characteristics of a preferred embodiment of the invention.
Figure 6:
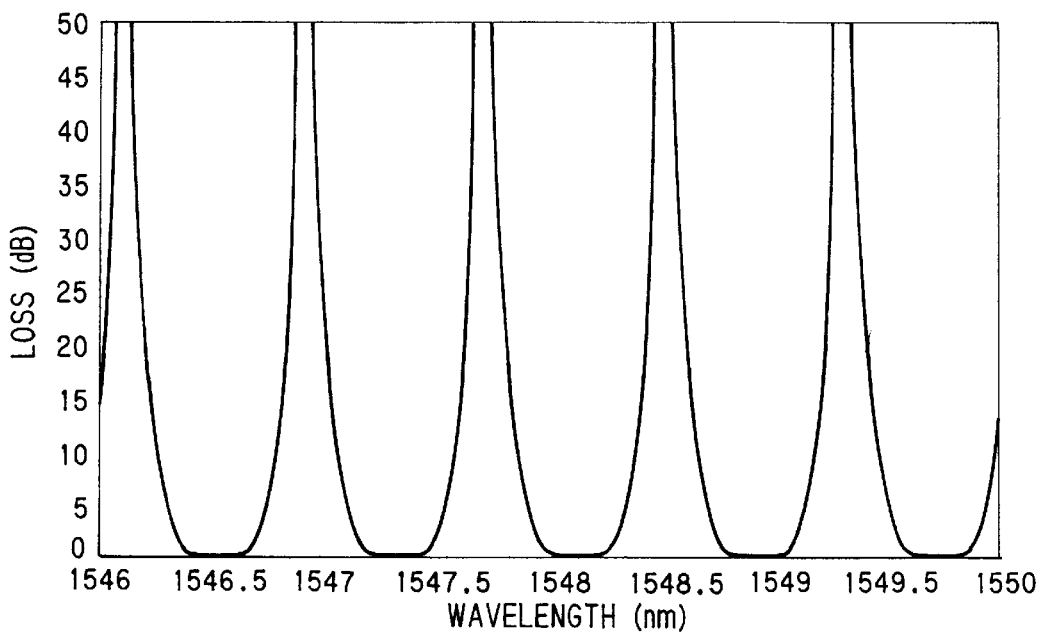
FIG. 6 is an explanatory view showing the wavelength loss characteristics in the case where there was a preparation error in a preferred embodiment of the invention.
Figure 7:
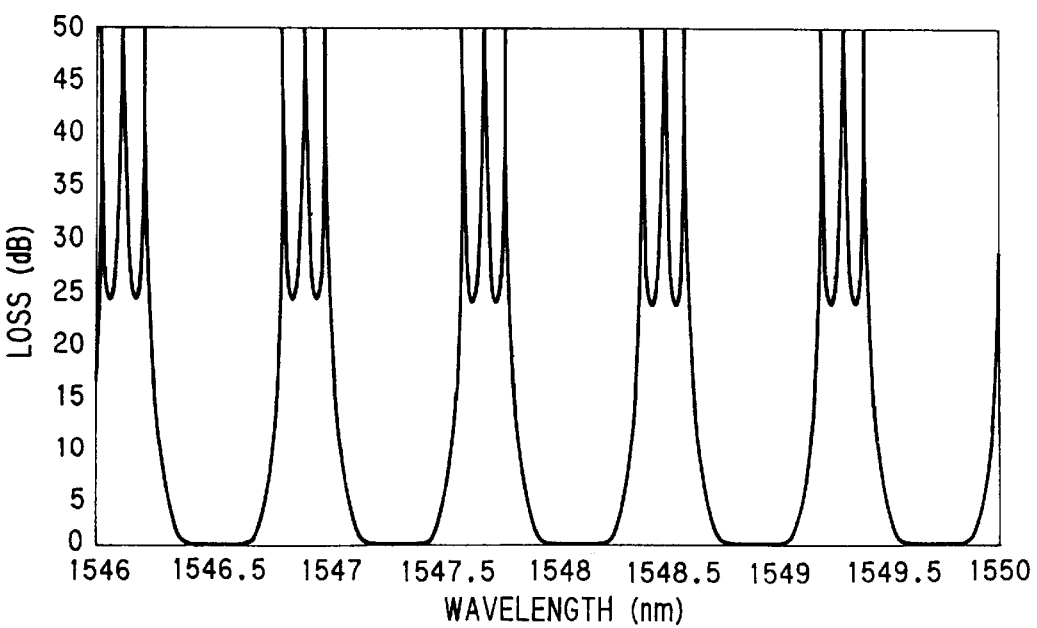
FIG. 7 is an explanatory view showing the wavelength loss characteristics in the case where there was a preparation error in a preferred embodiment of the invention.
Figure 12:
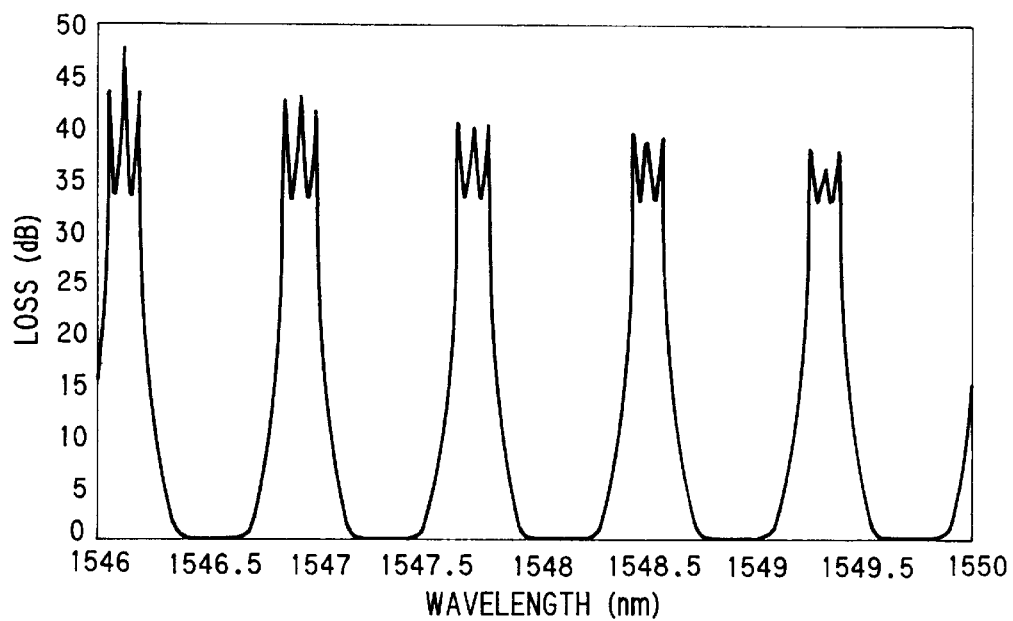
FIG. 12 is an explanatory view showing the wavelength loss characteristics of a prior art technique.
Figure 13:
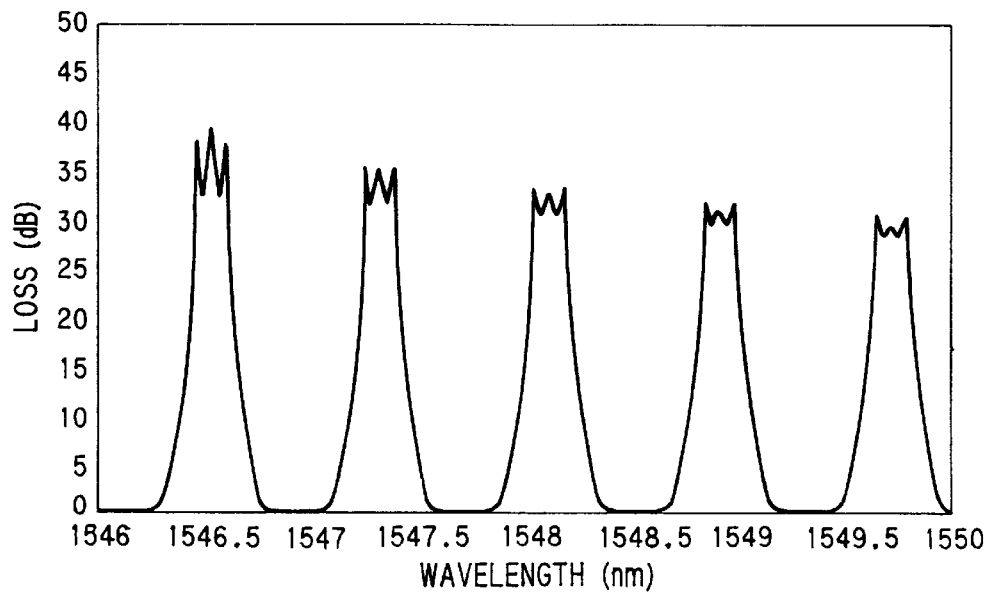
FIG. 13 is an explanatory view showing the wavelength loss characteristics of a prior art technique.
Figure 14:
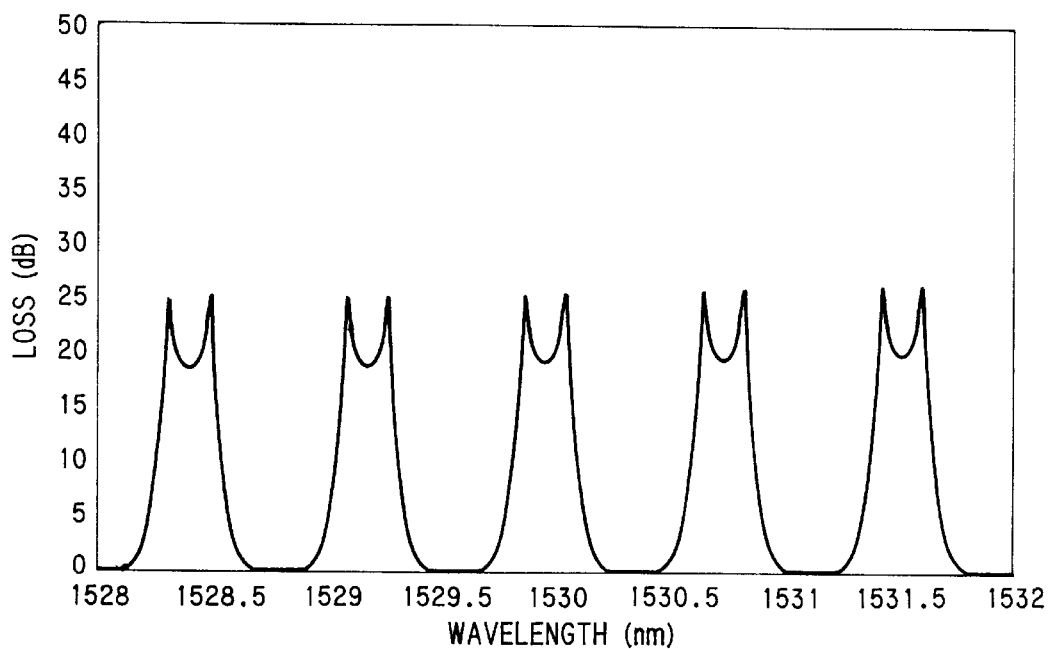
FIG. 14 is an explanatory view showing the wavelength loss characteristics of a prior art technique.
Figure 15:
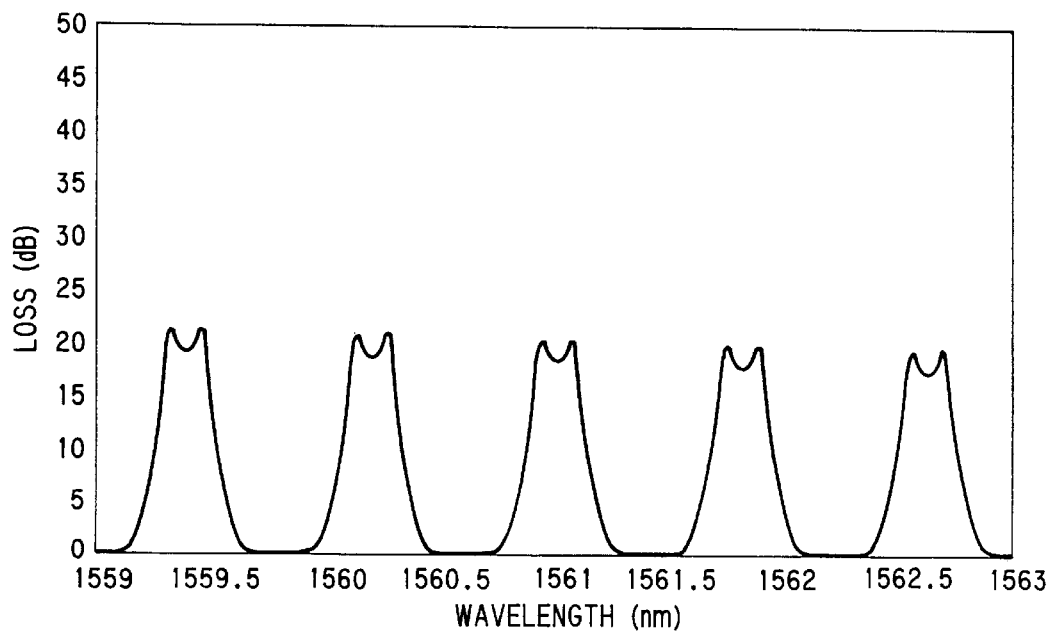
FIG. 15 is an explanatory view showing the wavelength loss characteristics of a prior art technique.
Figure 16:
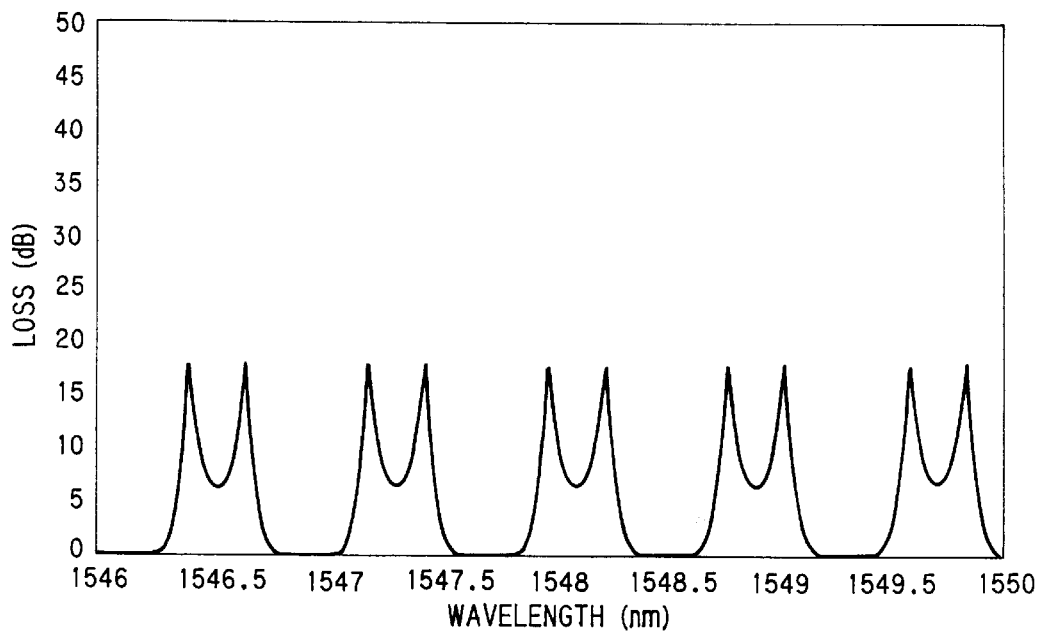
FIG. 16 is an explanatory view showing the wavelength loss characteristics of a prior art technique in the case where there was a preparation error.
Figure 17:
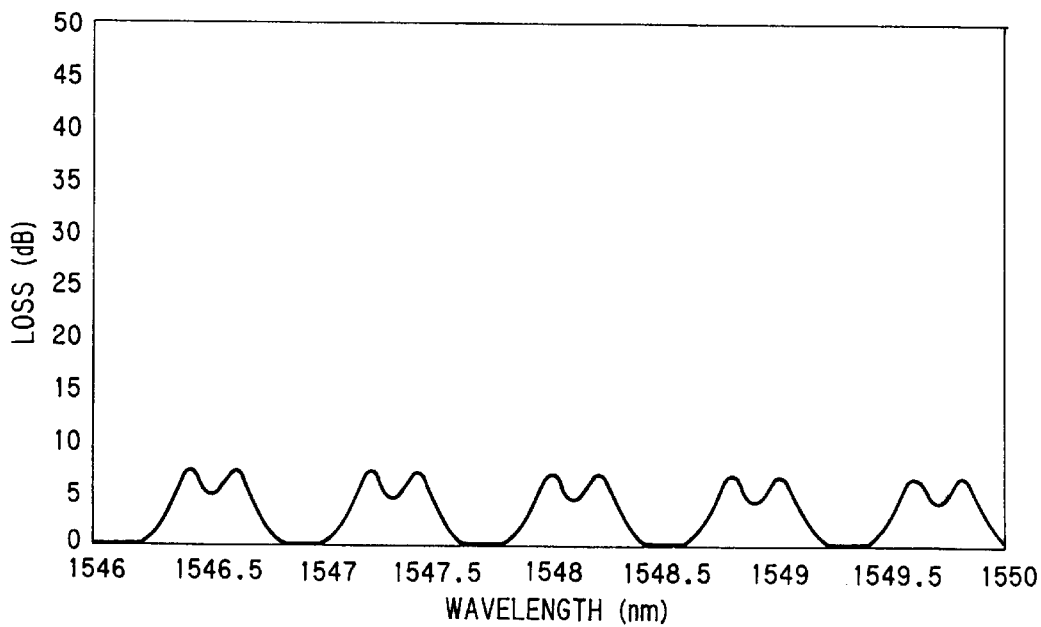
FIG. 17 is an explanatory view showing the wavelength loss characteristics of a prior art technique in the case where there was a preparation error.

FIGS. 2 and 3 are diagrams showing various characteristics of this preferred embodiment. FIG. 2 is a diagram illustrating wavelength loss characteristics in the wavelength range of 1.546 μm to 1.55 μm in the case where light is introduced through the input port 2 and output through the output port 4, while FIG. 3 is a diagram illustrating wavelength loss characteristics where the light is output through the output port 5. The comparison of FIGS. 2 and 3 showing the preferred embodiment of the invention and FIGS. 12 and 13 showing the prior art technique reveals that, according to the invention, even in the narrow wavelength range, excellent isolation can be realized. FIGS. 4 and 5 show wavelength characteristics respectively on the shorter wavelength side and the longer wavelength side, indicating that the characteristics are satisfactory for practical use. These results demonstrate that the device according to this preferred embodiment can function in the wavelength range of 1.53 μm to 1.56 μm. FIGS. 6 and 7 show the influence of an error caused in the preparation of the gap, Gap, between waveguides. Specifically, FIG. 6 shows wavelength characteristics in the case where the gap has been narrowed by 0.3 μm, and FIG. 7 wavelength characteristics in the case where the gap has been widened by 0.3 μm. In the prior art technique, as shown in FIGS. 16 and 17, the wavelength loss characteristics are significantly deteriorated, whereas the device according to this preferred embodiment is less likely to undergo the influence of a preparation error.

Figure 8:
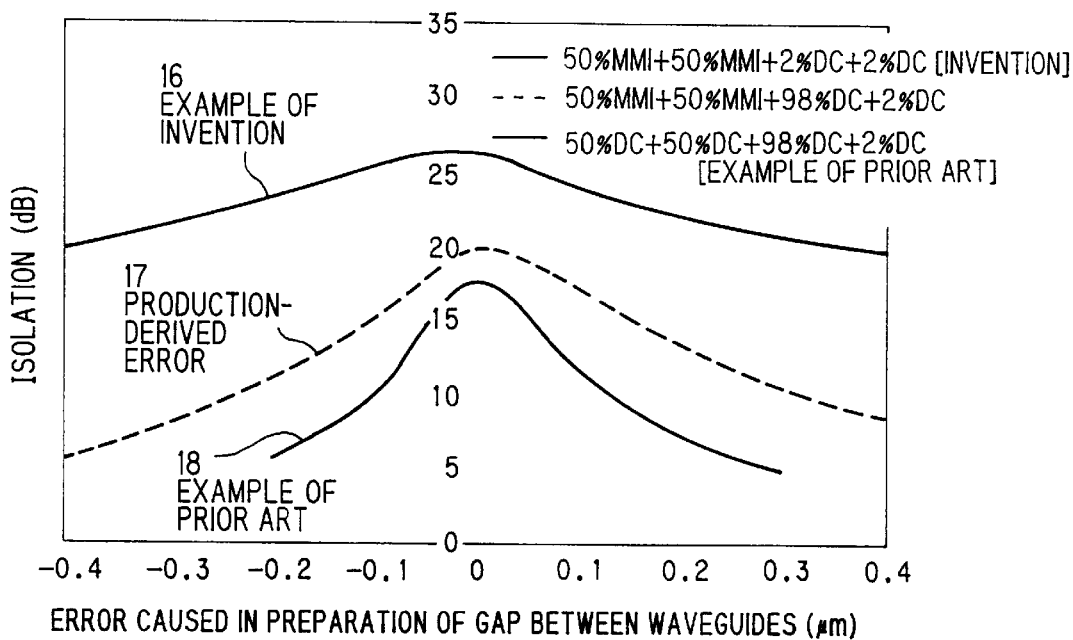
FIG. 8 is an explanatory view showing a deterioration in isolation at ITU wavelength ±0.08 nm attributable to a preparation error.

FIG. 8 shows a deterioration in ITU-grid wavelength ±0.08 nm isolation characteristics in the wavelength range of 1.53 μm to 1.56 μm attributable to a preparation error for the optical multiplexer/demultiplexer according to this preferred embodiment, in comparison with a deterioration in ITU-grid wavelength ±0.08 nm isolation characteristics in the wavelength range of 1.53 μm to 1.56 μm for the conventional optical multiplexer/demultiplexer. In the conventional optical multiplexer/demultiplexer 18, even when there is no preparation error, the isolation is as low as about 17 dB due to the wavelength dependency of the directional coupler. A dotted line 17 represents characteristics in the case where only the first and second optical couplers are MMI couplers (the third optical coupler having a percentage coupling of 98%). From this drawing, it is evident that the effect of the invention is exceptional.

It should be noted that, in the invention, all waveguide preparation processes commonly used in the art can be applied as the device preparation process.

Further, the invention can be realized by the waveguide type, as well as fiber-type couplers and the like.

As described above, the invention can offer the following advantages.

(1) The use of MMI couplers having a small wavelength dependency and a reduction in percentage coupling of the other optical couplers can realize an optical multiplexer/demultiplexer which has a minimized influence of wavelength dependency of directional couplers and can function over a wide wavelength range.

(2) The adoption of a construction using MMI couplers and directional couplers having a low percentage coupling can offer an advantage that the device is less likely to undergo the influence of a preparation error.

(3) The device according to the invention can be constructed without providing a narrow gap between waveguides (the gap being at least wider than the core height of the waveguide). Therefore, there is no fear of a failure of embedding in the narrow gap. This leads to the preparation of the device in a good yield.

(4) Since a wavelength-flat passband and a wide rejection band can be realized, multistage connection does not narrow the passband. Therefore, the invention is useful in wavelength multiplexing communication systems, for example, Add/Drop systems.

The invention has been described in detail with particular reference to preferred embodiments, but it will be understood that variations and modifications can be effected within the scope of the invention as set forth in the appended claims.

What is claimed is:

1. An optical multiplexer/demultiplexer having a construction such that Mach-Zehnders, each comprising four optical couplers each having two input ports and two output ports and disposed in series while connecting the adjacent two optical couplers to each other by two waveguides different from each other in length, are connected in multistage, wherein:

on a first connection side, a longer waveguide in the waveguides connecting a first optical coupler to a second optical coupler, a shorter waveguide in the waveguides connecting the second optical coupler to a third optical coupler, and a longer optical waveguide in the waveguides connecting the third optical coupler to a fourth optical coupler are continuously connected, while on a second connection side opposite to the first connection side, a shorter waveguide in the waveguides connecting the first optical coupler to the second optical coupler, a longer waveguide in the waveguides connecting the second optical coupler to the third optical coupler, and a shorter waveguide in the waveguides connecting the third optical coupler to the fourth optical coupler are continuously connected; and the first optical coupler and the second optical coupler are an MMI (multi mode interference) coupler having a percentage coupling of about 50%.

2. An optical multiplexer/demultiplexer having a construction such that Mach-Zehnders, each comprising four optical couplers each having two input ports and two output ports and disposed in series while connecting the adjacent two optical couplers to each other by two waveguides different from each other in length, are connected in multistage, wherein:

on a first connection side, a longer waveguide in the waveguides connecting a first optical coupler to a second optical coupler, a shorter waveguide in the waveguides connecting the second optical coupler to a third optical coupler, and a longer optical waveguide in the waveguides connecting the third optical coupler to a fourth optical coupler are continuously connected, while on a second connection side opposite to the first connection side, a shorter waveguide in the waveguides connecting the first optical coupler to the second optical coupler, a longer waveguide in the waveguides connecting the second optical coupler to the third optical coupler, and a shorter waveguide in the waveguides connecting the third optical coupler to the fourth optical coupler are continuously connected; and when the difference in phase created between two waveguides connecting the first optical couplet to the second optical coupler is $\phi$, the difference in phase created between two waveguides connecting the second optical coupler to the third optical coupler is about $2\phi$ while the difference in phase created between two waveguides connecting the third optical coupler to the fourth optical coupler is about $4\phi \pm \Pi$.

3. An optical multiplexer/demultiplexer having a construction such that Mach-Zehnders, each comprising four optical couplers each having two input ports and two output ports and disposed in series while connecting the adjacent two optical couplers to each other by two waveguides different from each other in length, are connected in multistage, wherein:

on a first connection side, a longer waveguide in the waveguides connecting a first optical coupler to a second optical coupler, a shorter waveguide in the waveguides connecting the second optical coupler to a third optical coupler, and a longer optical waveguide in the waveguides connecting the third optical coupler to a fourth optical coupler are continuously connected, while on a second connection side opposite to the first connection side, a shorter waveguide in the waveguides connecting the first optical coupler to the second optical coupler, a longer waveguide in the waveguides connecting the second optical coupler to the third optical coupler, and a shorter waveguide in the waveguides connecting the third optical coupler to the fourth optical coupler are continuously connected; and when the difference in length between two waveguides connecting the first optical coupler to the second optical coupler is ΔL, the difference in length between two waveguides connecting the second optical coupler to the third optical coupler is 2ΔL while the difference in length between two waveguides connecting the third optical coupler to the fourth optical coupler is shorter or longer by half of the wavelength in waveguide (waveguide wavelength) in the waveband used than 4ΔL.

4. An optical multiplexer/demultiplexer having a construction such that Mach-Zehnders, each comprising four optical couplers each having two input ports and two output ports and disposed in series while connecting the adjacent two optical couplers to each other by two waveguides different from each other in length, are connected in multistage, wherein:

on a first connection side, a longer waveguide in the waveguides connecting a first optical coupler to a second optical coupler, a shorter waveguide in the waveguides connecting the second optical coupler to a third optical coupler, and a longer optical waveguide in the waveguides connecting the third optical coupler to a fourth optical coupler are continuously connected, while on a second connection side opposite to the first connection side, a shorter waveguide in the waveguides connecting the first optical coupler to the second optical coupler, a longer waveguide in the waveguides connecting the second optical coupler to the third optical coupler, and a shorter waveguide in the waveguides connecting the third optical coupler to the fourth optical coupler are continuously connected; and the third optical coupler and the fourth optical coupler are a directional coupler having a percentage coupling of less than 10%.

5. The optical multiplexer/demultiplexer according to claim 1, further comprising a quartz-based plane optical wave circuit including a substrate and, provided on the substrate, a core waveguide and a cladding covering the core waveguide.

6. An optical multiplexer/demultiplexer having a construction such that Mach-Zehnders, each comprising four optical couplers each having two input ports and two output ports and disposed in series while connecting the adjacent two optical couplers to each other by two waveguides different from each other in length, are connected in multistage, wherein:

on a first connection side, a longer waveguide in the waveguides connecting a first optical coupler to a second optical coupler, a shorter waveguide in the waveguides connecting the second optical coupler to a third optical coupler, and a longer optical waveguide in the waveguides connecting the third optical coupler to a fourth optical coupler are continuously connected, while on a second connection side opposite to the first connection side, a shorter waveguide in the waveguides connecting the first optical coupler to the second optical coupler, a longer waveguide in the waveguides connecting the second optical coupler to the third optical coupler, and a shorter waveguide in the waveguides connecting the third optical coupler to the fourth optical coupler are continuously connected; and in the third optical coupler and the fourth optical coupler, when viewed in cross section, the gap between the core waveguides is larger than a height of the core waveguides, with the gap being measured in a first direction and the height being measured in a second direction orthogonal to the first direction.

7. The optical multiplexer/demultiplexer according to claim 2, further comprising a quartz-based plane optical wave circuit including a substrate and, provided on the substrate, a core waveguide and a cladding covering the core waveguide.

8. The optical multiplexer/demultiplexer according to claim 3, further comprising a quartz-based plane optical wave circuit including a substrate and, provided on the substrate, a core waveguide and a cladding covering the core waveguide.

9. The optical multiplexer/demultiplexer according to claim 4, further comprising a quartz-based plane optical wave circuit including a substrate and, provided on the substrate, a core waveguide and a cladding covering the core waveguide.

10. An optical multiplexer/demultiplexer, comprising:
a multi-mode interference coupler, having two input ports and two output pods;
a directional coupler, having two input ports and two output ports, and disposed in series with the multi-mode interference coupler;
a first waveguide, having a first length, disposed serially between the multi-mode interference coupler and the directional coupler; and
a second waveguide, having a second length different than the first length, disposed serially between the multi-mode interference coupler and the directional coupler;
wherein the multi-mode interference coupler has a percent coupling of approximately 50%.

11. An optical multiplexer/demultiplexer, comprising:
a multi-mode interference coupler, having two input ports and two output ports;
a directional coupler, having two input ports and two output ports, and disposed in series with the multi-mode interference coupler;
a first waveguide, having a first length, disposed serially between the multi-mode interference coupler and the directional coupler; and
a second waveguide, having a second length different than the first length, disposed serially between the multi-mode interference coupler and the directional coupler;
wherein the directional coupler has a percent coupling of approximately 2%.

12. An optical multiplexer/demultiplexer, comprising:
a multi-mode interference coupler, having two input ports and two output ports;
a directional coupler, having two input ports and two output ports, and disposed in series with the multi-mode interference coupler;
a first waveguide, having a first length, disposed serially between the multi-mode interference coupler and the directional coupler: and
a second waveguide, having a second length different than the first length, disposed serially between the multi-mode interference coupler and the directional coupler;

wherein the multi-mode interference coupler has a first percent coupling and the directional coupler has a second percent coupling much smaller than the first percent coupling.

13. An optical multiplexer/demultiplexer, comprising:

a multi-mode interference coupler, having two input ports and two output ports;

a directional coupler, having two input ports and two output ports, and disposed in series with the multi-mode interference coupler;

a first waveguide, having a first length, disposed serially between the multi-mode interference coupler and the directional Coupler;

a second waveguide, having a second length different than the first length, disposed serially between the multi-mode Interference coupler and the directional coupler;

another multi-mode interference coupler, having two input ports and two output ports, and disposed in series with the multi-mode interference coupler and the directional coupler;

another directional coupler, having two input ports and two output ports, and disposed in series with the multi-mode interference coupler, the other multi-mode interference coupler and the directional coupler;

a third waveguide, having a third length, disposed serially between the multi-mode interference coupler and the other multi-mode interference coupler;

a fourth waveguide, having a fourth length different than the third length, disposed serially between the multi-mode interference coupler and the other multi-mode interference coupler;

a fifth waveguide, having a fifth length, disposed serially between the directional coupler and the other directional coupler; and a sixth waveguide, having a sixth length different than the fifth length, disposed serially between the directional coupler arid the other directional coupler.

14. An optical multiplexer/demultiplexer, comprising:

a multi-mode interference coupler, having two input ports and two output ports;

a directional coupler, having two input ports and two output ports, and disposed in series with the multi-mode interference coupler;

a first waveguide, having a first length, disposed serially between the multi-mode interference coupler and the directional coupler; and a second waveguide, having a second length different than the first length, disposed serially between the multi-mode interference coupler and the directional coupler;

wherein the first waveguide includes a first core and the second waveguide includes a second core; and wherein in a crosssectional view, a gap between the first and second cores is larger than a respective height of each of the first and the second cores, with the gap being measured in a first direction and the height being measured in a second direction orthogonal to the first direction.

* * * * *